United States Patent
Tatourian et al.

(10) Patent No.: US 10,325,329 B2
(45) Date of Patent: Jun. 18, 2019

(54) SMART HOME SECURITY OF METERED DATA USING A MASK

(71) Applicant: McAfee, Inc., Santa Clara, CA (US)

(72) Inventors: Igor Tatourian, Santa Clara, CA (US); Rita H. Wouhaybi, Portland, OR (US); Hong C. Li, El Dorado Hills, CA (US); Tobias M. Kohlenberg, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 697 days.

(21) Appl. No.: 14/569,344

(22) Filed: Dec. 12, 2014

(65) Prior Publication Data

US 2016/0171632 A1 Jun. 16, 2016

(51) Int. Cl.
*G06Q 50/06* (2012.01)
*H04Q 9/00* (2006.01)

(52) U.S. Cl.
CPC .............. *G06Q 50/06* (2013.01); *H04Q 9/00* (2013.01); *G06F 2221/2135* (2013.01); *G06Q 2220/00* (2013.01); *H04Q 2209/60* (2013.01)

(58) Field of Classification Search
CPC ................ G06Q 50/06; H04L 63/1441; G06F 2221/2135
USPC .......................................................... 725/30
See application file for complete search history.

(56) References Cited

U.S. PATENT DOCUMENTS

| | | | | |
|---|---|---|---|---|
| 8,214,910 B1 * | 7/2012 | Gossweiler, III | ........ | H04K 1/02 455/1 |
| 2003/0210785 A1 * | 11/2003 | Jian | ........................ | H04N 5/913 380/210 |
| 2006/0206433 A1 * | 9/2006 | Scoggins | ............... | G01D 4/004 705/63 |
| 2008/0195562 A1 * | 8/2008 | Worth | .................... | G01R 22/10 705/412 |
| 2011/0270453 A1 * | 11/2011 | Kalogridis | ................ | H02J 3/14 700/291 |
| 2012/0124367 A1 * | 5/2012 | Ota | ........................ | H04W 12/04 713/153 |
| 2012/0212366 A1 * | 8/2012 | Alalusi | ..................... | G01S 7/03 342/118 |
| 2013/0226813 A1 * | 8/2013 | Voltz | ............... | G06Q 20/38215 705/67 |
| 2013/0314249 A1 * | 11/2013 | Le Buhan | .............. | G01D 4/002 340/870.02 |
| 2015/0089639 A1 * | 3/2015 | Cohn | ..................... | H04L 63/14 726/22 |

(Continued)

OTHER PUBLICATIONS

Kim, Jay (1986), "A Method for Limiting Disclosure in Microdata Based on Randome Noise and Transformation", Bureau of the Census, 5 pages.

*Primary Examiner* — Bryan F Wright
(74) *Attorney, Agent, or Firm* — Hanley, Flight & Zimmerman, LLC

(57) ABSTRACT

A technique allows a smart meter to receive a mask. The smart meter may receive the mask from a utility company or an escrow service. The smart meter may apply the mask to original metered data on a continuous schedule, on a periodic schedule, or on a determined schedule, or on a randomized schedule to conceal the original metered data. The smart meter may apply different masks at different times. The smart meter transmits the concealed metered data as augmented metered data remotely to an electric utility via a communication network.

24 Claims, 6 Drawing Sheets

(56) References Cited

U.S. PATENT DOCUMENTS

2015/0128283 A1* 5/2015 Mashima ............... G06Q 50/06
726/26

* cited by examiner

SMART HOME SECURITY OF METERED DATA USING A MASK

TECHNICAL FIELD

Embodiments described herein generally relate to data security for a smart meter, and more particularly to a system and method for providing confidentiality of metered data that is transmitted over a smart grid.

BACKGROUND ART

Modern electrical grid systems are based on electric utilities and interconnected networks that deliver one-way flow of electricity from suppliers to consumers. However, increasing demand for energy, depleting fossil-based resources and a changing climate are emerging as challenges to continued and uninterrupted supply of electric power from electric utilities. As green energy sources such as, for example, solar, wind and geothermal sources emerge as a source of energy generation at residential homes, modernized systems must allow energy from these small distributed energy sources to be supplied to the grid. Therefore, as today's grid architecture is transformed into a smart grid, two-way flow of electricity and two-way flow of information is needed.

To achieve this two-way flow of information, electric utilities have installed smart meters at residential homes. Smart meters record near-real time information on consumer electricity usage in the home. The recorded information is subsequently transmitted to utilities on a predetermined schedule as metered data via a communication network. Transmitted metered data (i.e., electricity usage data) for a home may offer a window into the lives of people inside the residence by revealing the occupants' daily schedules, current occupancy level, use of individual appliances or the like.

Recently, transmitted metered data has raised confidentiality issues with respect to protecting personal privacy and safeguarding proprietary information from unauthorized access. For example, metered data that is transmitted over a communication network may potentially be subject to interception or theft by unauthorized third parties or hackers. Malicious attacks by hackers, who may eavesdrop on these communication networks, can gain access to personal and/or proprietary information, for example, access to consumer usage information or customer confidential account information. Additionally, metered data may provide appliance usage patterns that can shed light on an occupant's behavior inside the home that may potentially compromise his privacy in the home.

Conventional methods to protect personal and/or confidential information have relied on cryptography. For example, the ZigBee® Smart Energy Profile (SEP) standard from the ZigBee® Alliance has been adapted in some home area networks. The ZigBee® SEP implementation uses a certificate for providing security of metered data that is transmitted from a smart meter. However, the ZigBee® SEP implementation is limited as it neither provides certificate revocation nor certificate renewal capability. Other methods to safeguard metered data or information may include Advanced Encryption Standards (AES), RSA or Elliptic Curve cryptography, which are computationally intensive. Attackers could still glean usage patterns over encrypted data in transit and where they have physical access to the Smart Meters, they could gain encryption keys and see the usage data. Additionally, detailed personal usage information is available to the electric utility from which occupants' behaviors in the home through the persons' energy consumption could be derived. A system and method for ensuring confidentiality of metered data on a device and transmitted from a smart meter over a communication network would be desirable.

DESCRIPTION OF EMBODIMENTS

Figure 1:
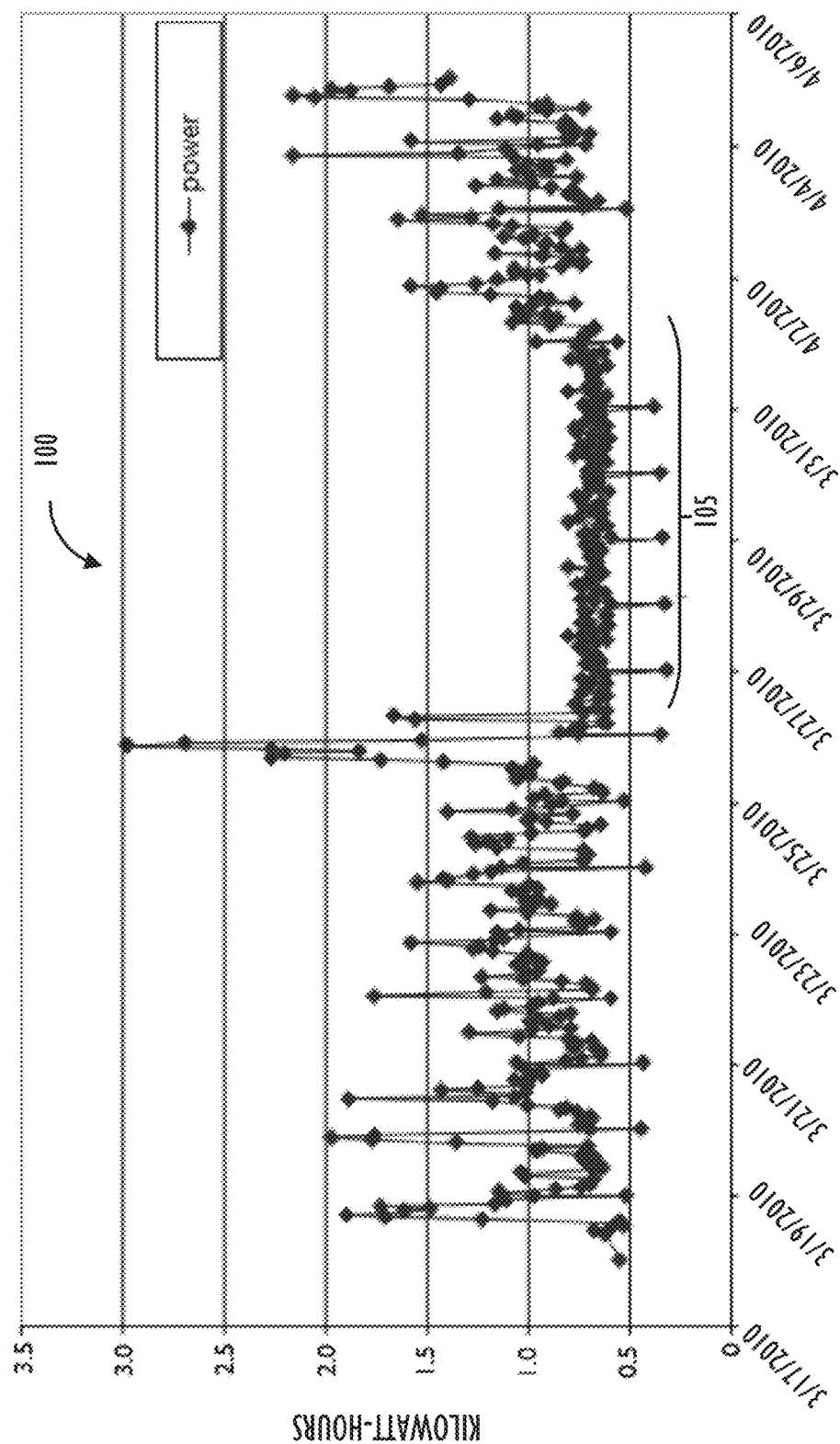
FIG. 1 is a graph illustrating power consumption in a home for a specific duration according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure or characteristic described in connection with the embodiments is included in at least one embodiment of the invention, and multiple references to "one embodiment" or "an embodiment" should not be understood as necessarily all referring to the same embodiment.

As used herein, the term "computer system" can refer to a single computer or a plurality of computers working together to perform the function described as being performed on or by a computer system.

As used herein, the term "mask" can refer to a data set that includes an arrangement of mask data arranged as an n-dimensional data set of rows and columns. The mask may be generated as a data structure in a programming language having an array of mask data such as, for example, an n-dimensional array of numbers. The mask is used to conceal power usage or consumption data for a residence by applying the data set to power usage data through addition, multiplication or the like.

As used herein, the term "smart meter" can refer to an electronic utility consumption meter that records consumption of electric energy in intervals and communicates that information back to the utility or the consumer via a communication network for monitoring and billing purposes. A smart meter enables two-way communication between the meter and utility through a power line communication or a wireless mesh communication. Other smart meters can include water or natural gas meters.

A technique allows a smart meter to receive a mask from an electric utility, an escrow service, or generated by a house computing device that controls house sensors and appliances. The mask can be an n-dimensional array of mask data, for example, random numbers, historical usage data, user generated data, user defined data or the like. Masks could be generated where it could deceive an attacker of the consumption data into making false assumptions. That is, transmitted consumption data may be intentionally made to appear to the attacker that there is no mask when transmitted usage data does not match actual usage activity or consumption data. Additionally, time-delayed data may be used to deceive an attacker. For example, an attacker may believe that usage data while the homeowner is traveling is actual usage data for the current period when previous usage data during normal activity in the home is transmitted during this current period while the homeowner is actually traveling. In this way, the mask may not be random and may be intentionally selected to construct false usage patterns. Furthermore the masks used to conceal the real usage data can be different when applied at different times to prevent an attacker from deriving patterns from the mask.

The mask is applied to energy consumption data that is received and stored at a smart meter as metered data. The mask is applied to the metered data to conceal and/or mask its details and thereby create augmented metered data. The augmented metered data, thus concealed, provides confidentiality of metered data as metered data is transmitted to an electric utility over a communication network and provides confidentiality of metered data that is stored in smart meter prior to transmission. The electric utility that receives the augmented metered data over a communication network may apply the mask to the augmented data in order to extract the original metered data. During this operation occupants' behavior patterns could be anonymized and only billing information is made available. Other embodiments include generating the mask at the utility, at an escrow service, or by the utility in negotiation with a user associated with a home having the smart meter. In one embodiment, different masks could be applied at different times. In other embodiments, the mask may be applied or repeated several times prior to applying the mask to the metered data. Also, metered data may be masked with a mask determined by the home, with a mask determined by an escrow service and a mask determined by a utility company.

Figure 2:
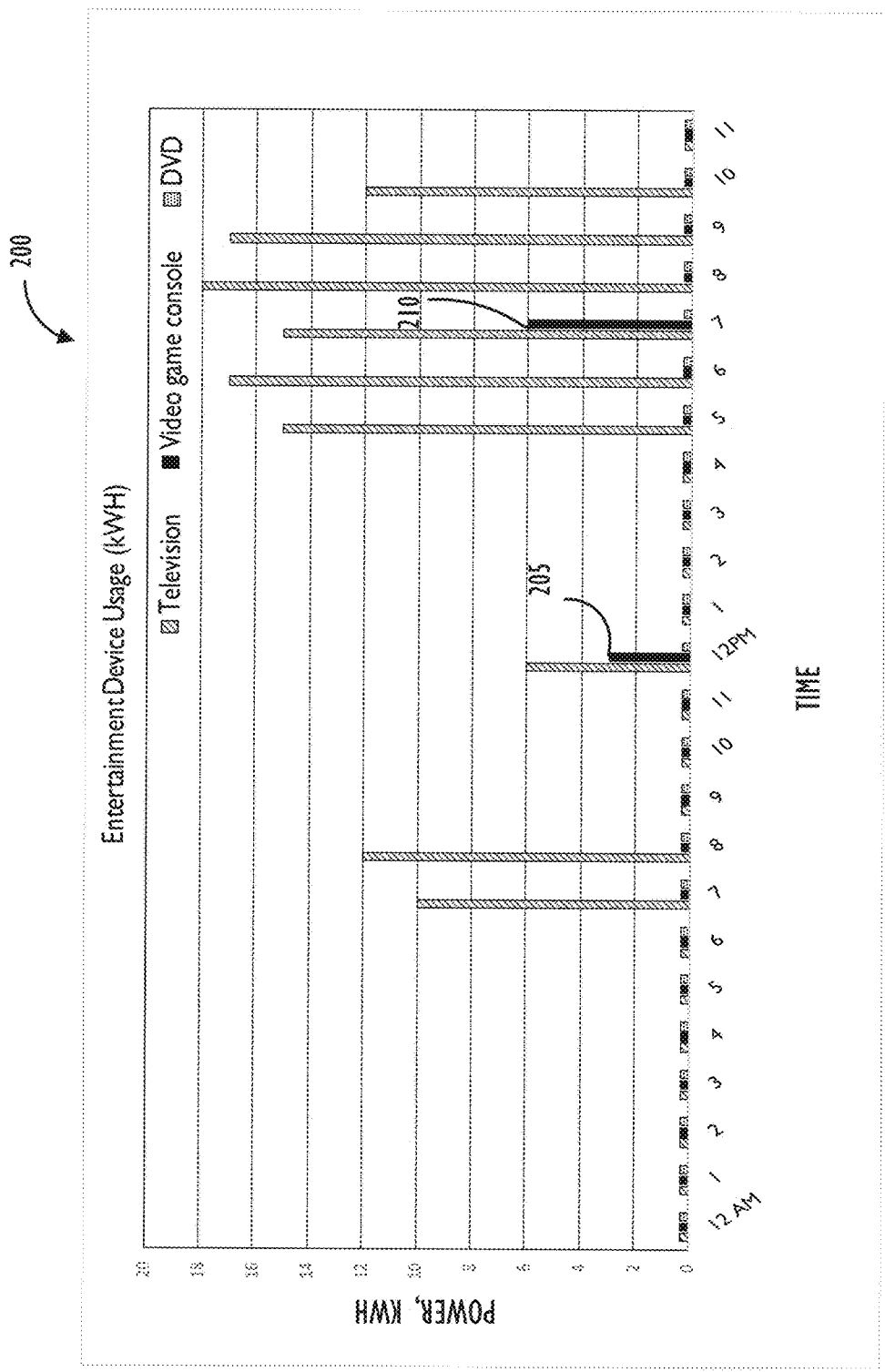
FIG. 2 is a graph illustrating power consumption by entertainment devices in a home according to one embodiment.

Referring to the figures, FIGS. 1 and 2 illustrate graphs of power usage or power consumption in a structure, for example, a residential home according to an embodiment. As illustrated in FIGS. 1 and 2, a smart meter can record aggregated power usage in kilowatt hours (kWh) by all appliances in the home over a specific duration and, additionally, as shown in FIG. 2, may record power usage by an individual appliance over a specific duration. The power usage is captured and stored in the smart meter prior to transmission to an electric utility. The aggregated power usage data may be stored as metered usage data 100 (hereinafter "metered data 100"). As shown in FIG. 1, metered data 100 depicts aggregated power usage in kilo watt hours (kWh) in the home over a specific duration, for example, aggregated power usage for a time period between Mar. 17, 2010 and Apr. 6, 2010. Metered data 100 may provide a look into a user's activities inside the home by analyzing aggregated power usage. For example, as shown in FIG. 1, aggregate power usage 110 depicts low power usage over several days from Mar. 27, 2010 to Apr. 1, 2010, whereby it may be inferred that the home is unoccupied. Also shown in FIG. 2, metered data 200 may also be captured for power usage by individual appliances in the home during a specific time period. For example, metered data 200 may provide information on power usage (in kWh) by entertainment devices between 12 AM and 12 PM during any particular day in the home such as, for example, power usage by a television, power usage by a video game console and power usage by a digital video disc (DVD) player. From data points 205 and 210, which represent power usage by a video game console at 12 PM and 7 PM, respectively, it may be possible to infer that a minor may be at home.

Figure 3:
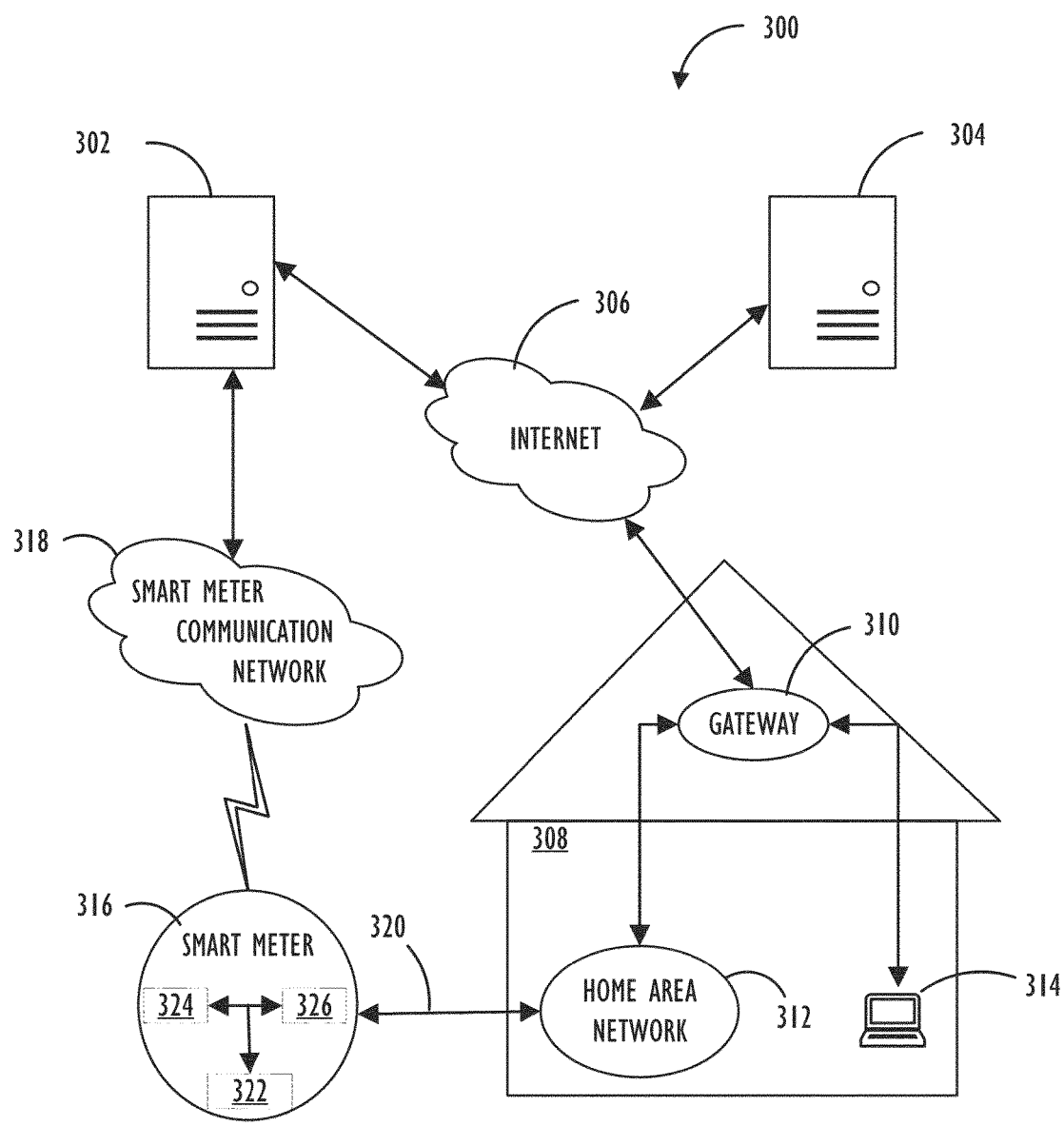
FIG. 3 is a diagram illustrating a system for smart home security of metered data according to one embodiment.

FIG. 3 illustrates a system 300 for implementing smart home security of metered data such as, for example, metered data 200 (FIG. 2) according to an embodiment. Particularly, system 300 is utilized for providing confidentiality of metered data 200 (FIG. 2) that is stored in smart meter 316 and transmitted from smart meter 316 to an electric utility. While system 300 is described in embodiments with respect to an electric utility, it is to be appreciated that system 300 is also applicable for use with metered data from other utilities where confidentiality of metered data is desired.

As shown in FIG. 3, system 300 may include a utility company server 302 ("utility server 302"), escrow server 304, Internet 306, home area network (HAN) 312 and smart meter 316. Utility server 302 may be associated with an electric utility company that provides electricity to a structure, for example, electricity to home 308. Home 308 is associated with smart meter 316, which is in close proximity to home 308 and receives its power usage. In embodiments, utility server 302 is configured to transmit one or more masks to smart meter 316 via HAN 312 or via smart meter communication network 318. Escrow server 304 may be associated with a utility escrow service and may be configured as a cloud server. Utility server 302 and escrow server 304 are in communication over Internet 306 for communicating information related to generating and transmitting a mask via HAN 312 or via network 318. In embodiments, escrow server 304 is configured to generate and transmit the mask directly to HAN 312 via Internet 306 or, in an embodiment, transmit the mask to utility server 302 that is subsequently sent to smart meter 316 by utility server 302 via network 318 or via HAN 312. In an embodiment, the mask may be encrypted using commonly known cryptography methods prior to transmitting the mask to smart meter 316 via HAN 312. It is to be appreciated that utility server 302 and escrow server 304 both include a processor, memory, and other storage devices for implementing smart home security. The processor is configured to execute instructions that are stored in the memory for configuring each of the servers 302 and 304 to implement the embodiments of smart home security described herein.

HAN 312 defines a local area network within home 308. HAN 312 interconnects in-home digital devices or appliances such as, for example, personal computers, mobile phones, entertainment technology, thermostats, home security systems, smart appliances or the like. HAN 312 is in communication with gateway/router 310, which facilitates communication between HAN 312 and Internet 306. In embodiments, HAN 312 is configured to receive the mask from utility server 302, escrow server 304 or a user computing device 314 for transmission to smart meter 316. For example, HAN 312 may receive a mask from utility server 302 that is generated either by utility server 302 or escrow server 304, may receive a mask from escrow server 304 that is generated by escrow server 304, or may receive a mask that is generated from historical power usage data sets stored at utility server 302 or received from a user associated with user computing device 314. Other embodiments can include data sets of user defined data sates, user generated data sets or any other similar data sets that are transmitted from user computing device 314 to utility server 302. The transmitted data sets may be subject to negotiation between utility company and the user prior to acceptance of the transmitted data sets for use in generating a mask as well as how the mask is used to obfuscate the metered data. In an embodiment, the mask may be encrypted using well known means prior to being received by HAN 312 or smart meter 316 from utility server 302 or escrow server 304.

Smart meter 316 is configured to measure and store power usage in home 308 as metered data (i.e., original metered data prior to concealment). Smart meter 316 may be in communication with HAN 312 over a wired or a wireless connection 320 for receiving a mask that is applied to the metered data. In an embodiment, the smart meter may receive dissimilar mask data for each mask that is received. In an embodiment, smart meter 316 includes logic to decrypt the mask that is received via HAN 312 prior to applying the mask to metered data. Smart meter 316 is in communication with utility server 302 via a dedicated smart meter communication network 318. Communication network 318 can include commonly available fixed networks such as Fixed Radio Frequency (RF) networks or high-voltage transmission line networks using Broadband over Power Line (BPL) protocol or Power Line Communications (PLC) protocol. Smart meter 316 can include a processor 322, memory 324 and other storage devices 322. The processor 322 is configured to execute instructions that are stored in memory 324. The instructions such as, for example, computer readable instructions may be executed by processor 322 to configure smart meter 316 to apply the mask to the metered data and create augmented metered data. The augmented metered data is transmitted periodically to utility server 302 for analysis, billing and the like via communication network 318. In an embodiment, smart meter 316 may include algorithms to encrypt the augmented metered data prior to transmission to utility server 302.

Figure 4:
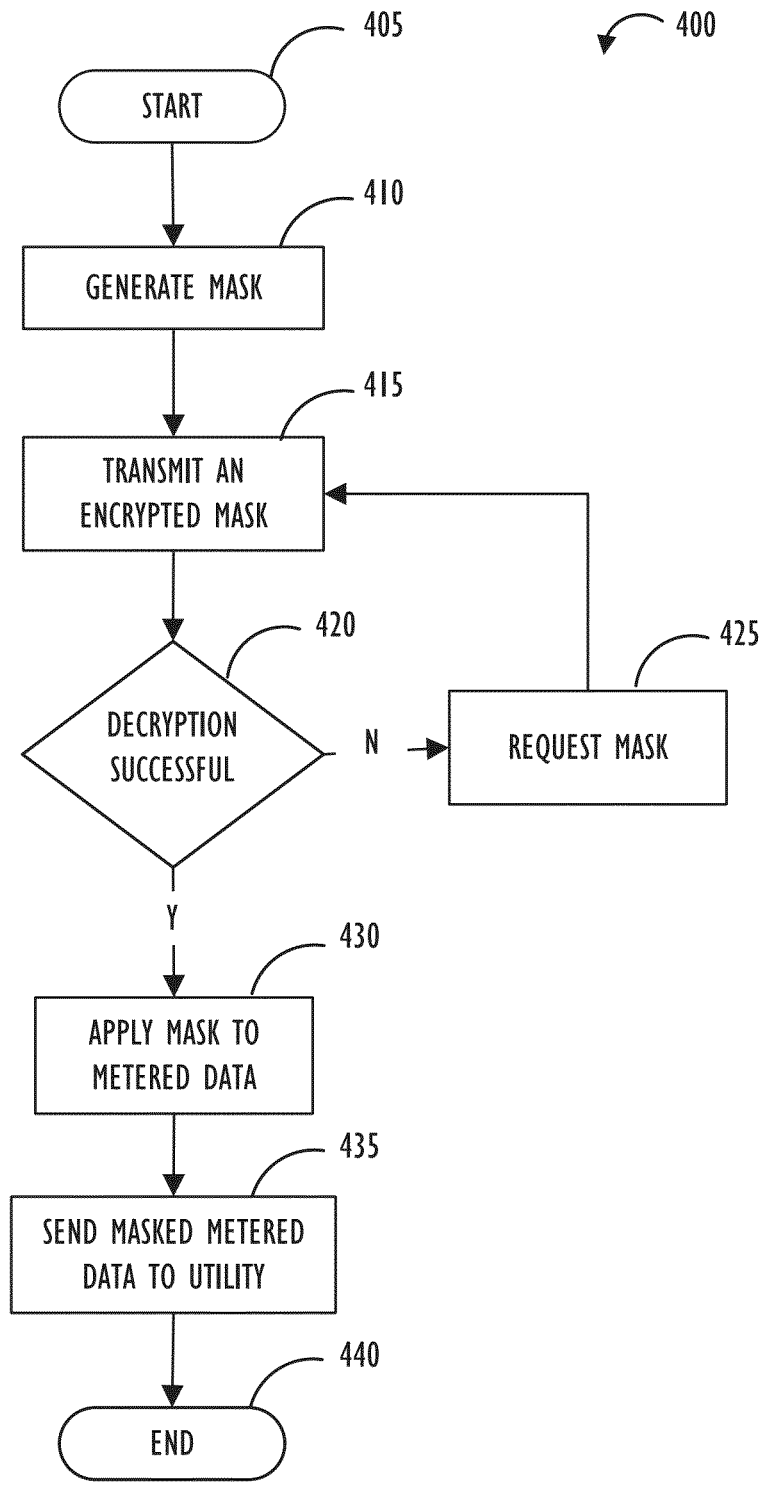
FIG. 4 is a flowchart illustrating a technique for smart home security of metered data according to one embodiment.

FIG. 4 is a flowchart illustrating a technique or process 400 for providing confidentiality of metered data according to an embodiment. Process 400 is implemented on system 300 of FIG. 3 and, therefore, FIG. 3 is also referenced in the description of process 400. Process 400 begins in step 405.

In 410, a mask is generated for use by smart meter 316. In an embodiment, the mask may be generated by utility server 302 from random data sets, by microaggregating data sets, by slicing and combining data sets, or the like. Alternatively, or in addition to using random or stored data, utility server 302 may also receive data sets from escrow server 304 that may be used to generate the mask. In one embodiment, utility server 302 may transmit a mask to smart meter 316 that is generated by utility server 302 via HAN 312 or via communication network 318. In another embodiment, utility server 302 may generate the mask from data sets that are received from or identified by a user associated with user computing device 314. For example, a user may identify or transmit historical power usage data or any other user defined data sets to utility server 302 via user computing device 314. This power usage data is transmitted to utility server 302 after being deemed acceptable to use as a mask by the user associated with user computing device 314. However, power usage data set that is sent by via user computing device 314 may be subject to negotiation between the user and the utility company until agreed upon by utility company for use in generating the mask at utility server 302.

In 415, the mask is transmitted to smart meter 316. In embodiments, the mask is transmitted to HAN 312 over Internet 306 for communication of the mask to smart meter 316 or alternatively, transmitted to smart meter 316 via communication network 318. In an embodiment, the mask may be encrypted using a commonly known encryption algorithm prior to transmission of the mask to smart meter 316. In embodiments, utility server 302 or escrow server 304 may schedule a plurality of masks to be transmitted to smart meter 316. For example, servers 302 and/or 304 may generate and transmit a plurality of encrypted masks regularly or on a predetermined schedule. Additionally, all copies of transmitted masks are stored in utility server 302.

Smart meter 316 may include a decryption key based on symmetric key cryptography for decrypting the mask. In 420, smart meter 316 applies its key and determines if decryption of the encrypted mask is successful. If decryption is unsuccessful (i.e., step 420="N"), in 425, smart meter 316 communicates with utility server 302 to request a new mask. However, if decryption is successful (i.e., step 420="Y"), in 430, smart meter 316 applies the mask to the stored metered data to create augmented metered data. Stored metered data is collected or captured by smart meter 316 that provides nuanced details of power usage per minute, per hour, or per day by individual appliances in home 308. In embodiments, the mask may be applied to stored metered data through addition, multiplication, subtraction, or the like. The mask may be applied continuously or periodically, by smart meter 316, to the stored metered data. For example, the mask may be applied continuously as the power usage data is captured by smart meter 316, may be applied periodically, for example, applied every hour or on a predetermined or defined schedule such as, for example, applied once a day. Also, the mask may be applied to any and all power usage data that is stored in smart meter 316 including power usage data for individual appliances, power usage data over a time period, or the like in home 308. In 435, the augmented metered data is transmitted to utility server 302 via communication network 318 on a periodic schedule or once a month.

Figure 5:
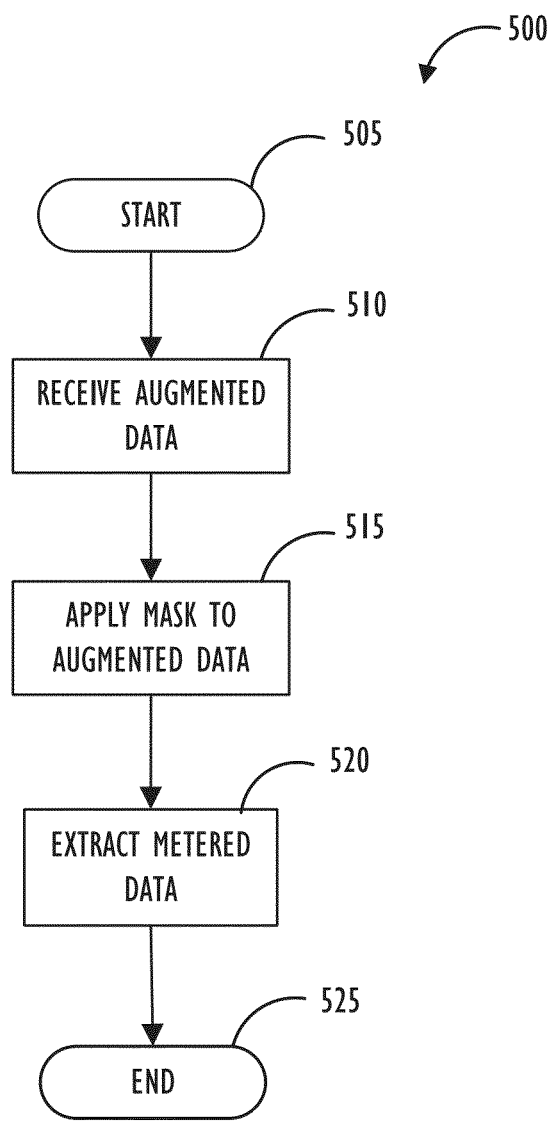
FIG. 5 is a flowchart illustrating a technique for smart home security of metered data according to one embodiment.

FIG. 5 is a flowchart illustrating a technique or process 500 that is performed on augmented metered data at a utility server 302 of FIG. 3 according to an embodiment. Process 500 begins in step 505. In 510, utility server 302 receives augmented metered data from smart meter 316. In 515, utility server 302 applies a copy of the mask to the augmented metered data. The copy of the mask may be determined based on one or more copies of masks that were transmitted to smart meter 316. In an embodiment, for the case where escrow server 304 generated the mask, the original mask may be received from escrow server 304 via Internet 306. In 520, the mask is applied to the augmented metered data and original metered data is extracted (i.e., augmented metered data is "demasked"). The extracted metered data may be processed for billing and/or analyzed. Process 500 ends in 525.

Figure 6:
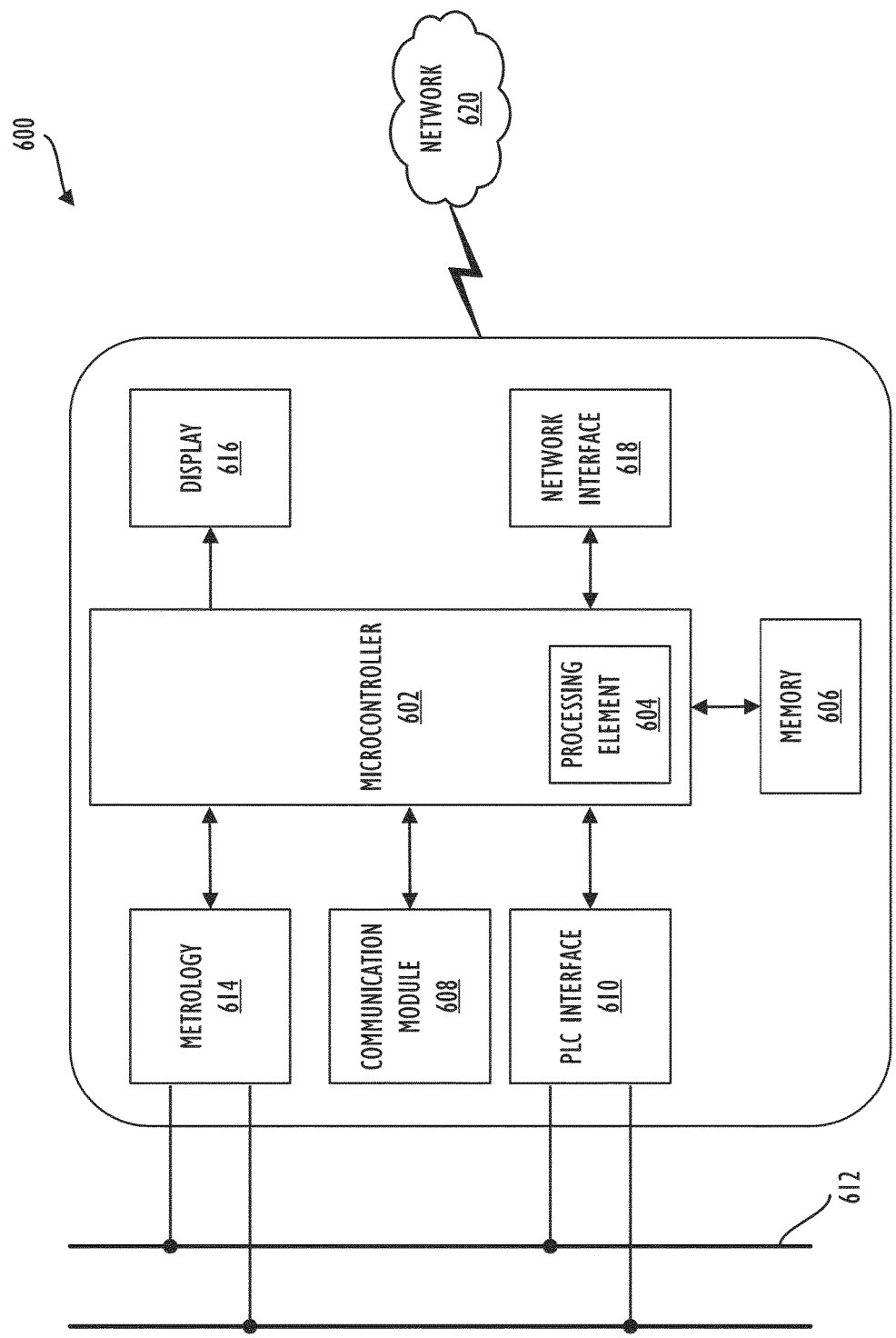
FIG. 6 is a block diagram illustrating a computing device for implementing the techniques described herein according to one embodiment.

FIG. 6 is a schematic block diagram of a smart meter 600 for home 308 (FIG. 3) according to one embodiment. The smart meter 600 is a network computing device that is configured to communicate with a utility server 302 and HAN 318 (FIG. 3) in order to implement smart home security of metered data. As illustrated in FIG. 6, smart meter 600 may include a single chip or board that includes a microcontroller 602, memory 606, metrology 614, communication module 608, plc interface 610 and network interface 618. Microcontroller 602 includes a processing element 604 communicatively coupled to memory 606. Processing element 604 is configured to execute code/ instructions that are stored in memory 604. While FIG. 6 illustrates a computing device with a single processing element 604, in embodiments, any number of processing elements may be present.

Memory 604 is an example of computer readable media and may take the form of volatile memory, such as random access memory (RAM) and/or non-volatile memory, such as read only memory (ROM) or flash RAM. Memory 604 is configured to store one or more software and/or firmware modules that may include computer-executable or machine-executable instructions, which are executable by processing element 604 to perform the technique described above in FIGS. 3-5. Smart meter 600 may include a communication module 608 and a power line communication (PLC) network interface module 610. Communication module 608 is configured to communicate with smart meter communication network 318 (FIG. 3) via radio frequency signals. For instance, communication module 608 may comprise a radio frequency (RF) transceiver configured to transmit and/or receive RF signals via one or more of a plurality of channels/ frequencies. Alternatively, or in addition to communicating with communication module 608, a PLC network interface module 610 is configured to communicate with utility server 302 (FIG. 3) utilizing power lines 612 of a power distribution network. For example, PLC network interface module 610 is configured to communicate with utility server 302 utilizing PLC. Metrology 614 is representative of any hardware and/or software that is configured to sense and measure electricity consumption for the home utilizing power lines 612. Network interface 618 may include hardware and/or software that is configured to communicate with a communication network 620 such as, for example, HAN 312 (FIG. 3). A display 616 may be configured to provide informational messages, instructions and energy consumption for home 308 (FIG. 3) that is connected to smart meter 600.

The following examples pertain to further embodiments.

Example 1 is a machine readable medium, on which are stored instructions, comprising instructions that when executed cause a smart meter to: receive one or more masks, wherein each mask comprises an array of mask data; apply the one or more mask to original metered data to create augmented metered data; and transmit the augmented metered data from the smart meter via a communication network.

In Example 2, the subject matter of Example 1 can optionally include instructions that when executed cause the smart meter to apply the one or more masks continuously to the original metered data.

In Example 3, the subject matter of Example 1 or 2 can optionally include instructions that when executed cause the smart meter to apply the one or more masks to the metered data on a periodic schedule or on a predetermined schedule.

In Example 4, the subject matter of Example 1 to 3 can optionally include that the one or more masks is encrypted, and wherein the instructions further comprise instructions that when executed cause the smart meter to decrypt the one or more masks responsive to receiving the one or more masks.

In Example 5, the subject matter of Example 1 to 4 can optionally include the array of mask data includes data that is related to historical consumption data of a residence associated with the smart meter or user generated data.

In Example 6, the subject matter of Example 1 to 5 can optionally include instructions that when executed cause the smart meter to receive the one or more masks on a periodic or predetermined schedule.

In Example 7, the subject matter of Example 1 can optionally include instructions that when executed cause the smart meter to encrypt the augmented metered data prior to transmission of the augmented metered data.

In Example 8, the subject matter of Example 1 to 6 can optionally include instructions that when executed cause the smart meter to receive a dissimilar mask data for each of the one or more masks.

Example 9 is a computer system for smart home security of data, comprising: one or more processors; and a memory coupled to the one or more processors, on which are stored instructions, comprising instructions that when executed cause one or more of the processors to: transmit one or more masks with an array of mask data; receive augmented metered data via a communication network; and apply the one or more masks to the augmented metered data.

In Example 10, the subject matter of Example 9 can optionally include wherein the computer system is a utility server.

In Example 11, the subject matter of Example 9 or 10 can optionally include wherein the instructions further comprise instructions that when executed cause the processor to receive the one or more masks from a remote server prior to transmitting the mask.

In Example 12, the subject matter of Example 9 to 11 can optionally include wherein the instructions further comprise instructions that when executed cause the processor to extract original metered data from the augmented metered data responsive to applying the one or more masks to the augmented metered data.

In Example 13, the subject matter of Example 9 to 12 can optionally include wherein the instructions further comprise instructions that when executed cause the processor to transmit the one or more masks on a periodic or determined schedule.

In Example 14, the subject matter of Example 9 to 13 can optionally include wherein the instructions further comprise instructions that when executed cause the processor to encrypt the one or more masks prior to transmitting the one or more masks.

In Example 15, the subject matter of Example 9 to 14 can optionally include wherein the instructions further comprise instructions that when executed cause the processor to generate the one or more masks based on a negotiation of historical consumption data, wherein the historical consumption data being received by the computer system.

In Example 16, the subject matter of Example 9 to 14 can optionally include wherein the instructions further comprise instructions that when executed cause the processor to generate the one or more masks based on a negotiation of user defined data, wherein the user defined data being received by the computer system.

In Example 17, the subject matter of Example 9 to 14 can optionally include wherein the instructions further comprise instructions that when executed cause the processor to apply a dissimilar mask data for each of the one or more masks.

Example 18 is a method for smart home security of data, comprising: receiving one or more masks with an array of mask data; applying the one or more masks to original metered data to create augmented metered data; and transmitting the augmented metered data via a communication network.

In Example 19, the subject matter of Example 18 can optionally include applying the one or more masks continuously to the original metered data.

In Example 20, the subject matter of Example 18 or 19 can optionally include applying the one or more masks to the metered data based on a periodic schedule or a predetermined schedule.

In Example 21, the subject matter of Example 18 or 19 can optionally include decrypting the one or more masks responsive to receiving the one or more masks.

In Example 22, the subject matter of Example 18 or 19 can optionally include receiving the one or more masks responsive to a negotiation of historical consumption data with a utility.

In Example 23, the subject matter of Example 18 or 19 can optionally include receiving the one or more masks responsive to a negotiation of user defined data with a utility.

In Example 24, the subject matter of Example 18 or 19 can optionally include receiving the one or more masks on a periodic or predetermined schedule.

In Example 25, the subject matter of Example 18 or 19 can optionally include encrypting the augmented metered data prior to transmitting the augmented metered data.

In Example 26, the subject matter of Example 18 or 19 can optionally include receiving a dissimilar mask data for each of the one or more masks.

Example 27 is a method for smart home security of data, comprising: transmitting one or more masks with an array of mask data; receiving augmented metered data via a communication network; and applying the one or more masks to the augmented metered data.

In Example 28, the subject matter of Example 27 can optionally include transmitting the one or more masks from a utility server.

In Example 29, the subject matter of Example 27 or 28 can optionally include receiving the one or more masks from a remote server prior to transmitting the one or more masks.

In Example 30, the subject matter of Example 27 or 28 can optionally include extracting original metered data from the augmented metered data responsive to applying the one or more masks to the augmented metered data.

In Example 31, the subject matter of Example 27 or 28 can optionally include transmitting the one or more masks on a periodic or predetermined schedule.

In Example 32, the subject matter of Example 27 or 28 can optionally include encrypting the one or more masks prior to transmitting the one or more masks.

In Example 33, the subject matter of Example 27 or 28 can optionally include generating the one or more masks based on a negotiation of historical consumption data, wherein the historical consumption data being received by the computer system.

In Example 34, the subject matter of Example 27 or 28 can optionally include generating the one or more masks based on a negotiation of user defined data of a user associated with a smart meter in a home, wherein the user defined data being received by the computer system.

In Example 35, the subject matter of Example 27 or 28 can optionally include transmitting dissimilar mask data for each of the one or more masks.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. At least one storage device or storage disk comprising instructions that, when executed, cause a smart meter to, at least:
   obtain an encrypted mask via a home area network, the encrypted mask generated based on historical consumption data of a home associated with the smart meter;
   detect and measure utility usage of the home;
   determine if the encrypted mask can be decrypted with a key of the smart meter;
   when the encrypted mask can be decrypted with the key, apply the decrypted mask to original metered data to create augmented metered data, the original metered data corresponding to the detected and measured utility usage of the home;
   when decryption of the encrypted mask using the key is unsuccessful, decrypt an alternate mask to create the augmented metered data; and
   transmit the augmented metered data from the smart meter via a communication network.

2. The at least one storage device or storage disk of claim 1, wherein the instructions, when executed, cause the smart meter to continuously apply the encrypted mask to the original metered data.

3. The at least one storage device or storage disk of claim 1, wherein the instructions, when executed, cause the smart meter to apply the encrypted mask to the original metered data on at least one of a periodic schedule or a predetermined schedule.

4. The at least one storage device or storage disk of claim 1, wherein the instructions, when executed, cause the smart meter to obtain the encrypted mask on at least one of a periodic schedule or a predetermined schedule.

5. The at least one storage device or storage disk of claim 1, wherein the instructions, when executed, cause the smart meter to encrypt the augmented metered data prior to transmission of the augmented metered data.

6. The at least one storage device or storage disk of claim 1, wherein the instructions, when executed, cause the smart meter to obtain dissimilar mask data for the alternate mask.

7. A smart meter for security of smart home data, comprising:
   a processor; and
   memory in communication with the processor the memory including instructions that, when executed, cause the processor to:
   detect and measure daily usage corresponding to a home associated with the smart meter;
   determine if an encrypted mask can be decrypted with a key of the smart meter;
   when the encrypted mask can be decrypted with the key, apply the decrypted mask based on historical consumption data to original metered data to create augmented metered data, the original metered data corresponding to the detected and measured utility usage corresponding to the home;
   when decryption of the encrypted mask using the key is unsuccessful, decrypt an alternate mask to create the augmented metered data; and
   transmit the augmented metered data via a communications network.

8. The smart meter of claim 7, wherein the processor is to continuously apply the encrypted mask to the original metered data.

9. The smart meter of claim 7, wherein the processor is to apply the encrypted mask to the original metered data based on at least one of a periodic schedule or a predetermined schedule.

10. The smart meter of claim 7, wherein the processor is to generate the encrypted mask based on user defined data associated with the smart meter.

11. The smart meter of claim 10, wherein the encrypted mask is related to a negotiation between the user defined data and a utility.

12. The smart meter of claim 10, wherein the encrypted mask is related to a negotiation between the historical consumption data and a utility.

13. The smart meter of claim 7, wherein the processor is to access the encrypted mask on at least one of a periodic schedule or a predetermined schedule.

14. The smart meter of claim 7, wherein the processor is to encrypt the augmented metered data prior to transmission of the augmented metered data.

15. The smart meter of claim 7, wherein the processor is to generate the historical consumption data of the home and transmit the historical consumption data to a utility server associated with a utility company.

16. The smart meter of claim 7, wherein the processor is to apply dissimilar mask data for the alternate mask.

17. A computer system for smart home security of data, comprising:
one or more processors; and
memory including instructions that, when executed, cause one or more of the processors to:
obtain an encrypted mask from an escrow server, the encrypted mask generated based on historical consumption data of a home associated with a smart meter;
transmit the encrypted mask to the smart meter;
obtain augmented metered data via a communication network, the augmented metered data corresponding to electric power measured at the home associated with the smart meter;
determine if the encrypted mask can be decrypted with a key of the smart meter;
when the encrypted mask can be decrypted with the key of the smart meter, apply the decrypted mask to the augmented metered data; and
when decryption of the encrypted mask using the key is unsuccessful, decrypt an alternate mask to create the augmented data.

18. The computer system of claim 17, wherein the computer system is a utility server.

19. The computer system of claim 18, wherein the one or more processors are to obtain the encrypted mask from a remote server prior to transmitting the encrypted mask.

20. The computer system of claim 17, wherein the one or more processors are to extract original metered data from the augmented metered data responsive to applying the encrypted mask to the augmented metered data.

21. The computer system of claim 17, wherein the one or more processors are to transmit the encrypted mask on at least one of a periodic schedule or a predetermined schedule.

22. The computer system of claim 17, wherein the one or more processors are to generate the encrypted mask based on a negotiation between a user associated with the historical consumption data and a utility.

23. The computer system of claim 17, wherein the one or more processors are to generate the encrypted mask based on a negotiation between user defined data and a utility.

24. The computer system of claim 17, wherein the one or more processors are to transmit dissimilar mask data for the alternate mask.

* * * * *